(12) United States Patent
Molde

(10) Patent No.: US 8,767,078 B2
(45) Date of Patent: Jul. 1, 2014

(54) PHOTOGRAPHIC MACHINE COMPRISING A CAMERA SYSTEM WITH EXCEPTIONAL 1,500MM-3000MM MEGA ZOOM CAPABILITY WITH 3 DISTINCT LEVELS OF MAGNIFICATION, IMAGE STABILIZATION, ACCURATE METERING, AND AUTO FOCUS CONFIRMATION

(71) Applicant: Ryan Kent Molde, Eden Prairie, MN (US)

(72) Inventor: Ryan Kent Molde, Eden Prairie, MN (US)

( * ) Notice: Subject to any disclaimer, the term of this patent is extended or adjusted under 35 U.S.C. 154(b) by 0 days.

(21) Appl. No.: 13/573,524

(22) Filed: Sep. 19, 2012

(65) Prior Publication Data

US 2013/0222626 A1 Aug. 29, 2013

Related U.S. Application Data

(63) Continuation of application No. 12/804,555, filed on Jul. 24, 2010, now abandoned.

(51) Int. Cl.
*H04N 5/228* (2006.01)
*H04N 5/262* (2006.01)

(52) U.S. Cl.
USPC ............. 348/208.12; 348/208.11; 348/240.99

(58) Field of Classification Search
CPC . H04N 5/23212; H04N 5/225; G03B 13/009; G03B 15/10; G03B 3/00; G03B 5/00; G03B 17/04
USPC ............... 348/208.11, 208.12, 240.99, 240.1, 348/240.2, 240.3
See application file for complete search history.

(56) References Cited

U.S. PATENT DOCUMENTS

| | | | |
|---|---|---|---|
| 6,850,280 B2 * | 2/2005 | Hirasawa et al. | 348/350 |
| 7,456,898 B2 * | 11/2008 | Hirasawa et al. | 348/354 |
| 7,719,605 B2 * | 5/2010 | Hirasawa et al. | 348/345 |
| 7,769,284 B2 * | 8/2010 | Tang et al. | 396/89 |
| 8,090,252 B1 * | 1/2012 | Tang et al. | 396/89 |
| 8,184,967 B2 * | 5/2012 | Tang et al. | 396/89 |

* cited by examiner

*Primary Examiner* — Twyler Haskins
*Assistant Examiner* — Padma Haliyur
(74) *Attorney, Agent, or Firm* — Workman Nydegger

(57) ABSTRACT

This camera system comprises a novel or new combination of three elements or parts including a 1000 mm focal length Maksutov Cassegrain MTO or Rubinar mirror lens threaded to an M42 to Sony Alpha mount or M42 to Olympus 4/3 mount adapter, both with their own "dandelion chip", programmed with the focal length of 1000 mm allowing for the only currently image stabilized lens of this length, also allowing the lens to communicate with the camera to allow proper metering and exposure as well as focus confirmation for faster, more certain sharp photos whether through "focus peaking" in the case of the Sony, or "catch in focus" and a confirmation beep with the Olympus, as well as 3 variable levels of zoom from 1500 mm to 3000 mm in the case of the Sony (incorporating both the crop factor of the sensor and the crop zoom push button feature) and 2× crop with Olympus.

26 Claims, 15 Drawing Sheets

PHOTOGRAPHIC MACHINE COMPRISING A CAMERA SYSTEM WITH EXCEPTIONAL 1,500MM-3000MM MEGA ZOOM CAPABILITY WITH 3 DISTINCT LEVELS OF MAGNIFICATION, IMAGE STABILIZATION, ACCURATE METERING, AND AUTO FOCUS CONFIRMATION

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of photography and more specifically supertelephoto or mega zoom capability comprising a fully functional camera system which has been extensively field tested, improved, developed, and perfected over many years of trial and error with exeptionally effective and unheard of 1,500-3000 mm lens magnification with image stabilization, accurate metering, and auto focus confirmation enabled through the novel addition of a programmable dandelion chip to enter the focal length of 1000 mm and aperture of f10 information, allowing the camera to recognize the lens, through communicating with the adapter, and coordinate the necessary calibrations for proper image stabilization settings in the camera's computer, proper exposure, and depending on which camera system, Sony or Olympus, either confirm that the subject is in focus through focus peaking, which is digitally outlining the subject with a bright glowing "aura" of color to speed the manual focus in the case of Sony, or activation of the auto focus confirmation beep in the case of Olympus. Surprisingly, even at this magnification, all this can be accomplished hand held, for low noise photos at 1/500 or so shutter speed at ISO 400 or 200, or even almost maximum resolution ISO 100 (in bright sunlight) without the necessity of a tripod, to allow a photographer to catch more fleeting shots than they would otherwise be able.

Although it has the ability to take occasional handheld photos for the fastest reaction time possible, especially with proper physical conditioning, strength training or preparation, for extended use I recommend a quick release clamp monopod as a compromise for faster setup than a conventional tripod. The in camera image stabilization is more than sufficient to couteract any camera shake in this situation. This is an intermediate solution between supporting the weight handheld and the three point stability of a tripod. The monopod is the recommended stand to provide maximum last second maneuverability, as it can pivot freely from the ground, and nearly instantaneous setup with image stabilization counteracting any excess movement of the camera and eliminating any resultant blur. The monopod attaches securely to the lens with a standard screw to balance the camera setup and spare the photographer any of the weight of the lens or the rest of the very sturdy contraption. It is important to attach the monopod to lens directly instead of the camera, to support the weight of the lens. If the lens is not supported at all times with either a monopod or one hand, it is heavy enough to warp the adapter so that it does not communicate properly or so that it can't be easily detached as an interchangeable lens.

By contrast, standard telephoto lenses of equivalent magnification are so prohibitively heavy even for a very strong photographer, that a handheld shot without support is out of the question. Most 1000 mm lenses still lack image stabilization so they require a tripod to support them and reduce the camera shake, vibration which is magnified along their entire length. More mass concentrated farther from the body is unweildy and awkward, almost impossible to handhold for any amount of time at the 800 mm focal lengths (and this alternative mirror lens system is nearly double this magnification at even its lowest of the three progressive zoom levels). Because of inertia, standard lenses also can not be moved or swung around as quickly. However, in this instance, since the 1000 mm mirror lens essentially folds the light in half, with the barrel half as long, it might not accentuate camera shake to such an extent because it is essentially a shorter lever, and certainly the center of gravity is closer to the photographer, making it less unweildy and allowing for hand held shots with the photographer providing the support, allowing for less set up time to quickly capture the moment. That's double the magnification at half the length and probably less than half the weight.

Right now, 1000 mm mirror lenses lack auto focus and image stabilization capability, both of which are enabled in the camera instead through the "dandelion chip", which in this case is uniquely used in this combination of three components to create mega zoom capabilites with features far beyond those found in previous setups. Currently, standard 1000 mm lenses cost more than most luxury cars and still lack built in image stabilization. In the instance of this contraption, the shake reduction is provided by Sony's in camera steady shot, or the equivalent Olympus technologies built into the camera. In the case of Olympus, likely it will soon feature the improved new 5 axis image stabilization from its mirrorless cameras, although it is not yet found in the compatible DSLR format. Recently, Olympus is starting to use Sony sensors, and with somewhat of a merger of the companies, the cameras may start to share more components and features in the future, so they may have similar improvements in the area of image stabilization as well, perhaps the best of both worlds.

With the M42 to Sony or M42 to Olympus adapter, information such as focal length of 1000 mm and aperture of f10 can now be programmed into the adapter sandwiched between the lens and the camera body, by utilizing the "dandelion chip" set of metal contacts strung along a wafer. When the lens is turned to lock on and attach to the camera, the metal plates of the dandelion chip align and match up with the pins in the camera body. These electrical contacts pass along the proper information allowing the camera and the lens to communicate, coordinate to calibrate the image stabilization correctly for such a supertelephoto lens and also allow proper light metering and exposure with the F-stop also provided to the camera's computers.

Since the camera now recognizes the lens, a focus confirmation beep is also enabled when proper focus is achieved, in the case of an Olympus camera, speeding the process even further for less of a chance of missing the shot. In the case of Sony, alternatively, the focus peaking feature will outline the subject in a color of the users choosing, creating a bright, visible aura contrasted against the background, indicating proper focus. Right now, modern standard lenses have autofocus capability, and this auto focus confirmation with a mirror lens allows a nearly equivalent alternative approach, for much faster manual focus at comparable speeds as the photographer gains experience, with the added image stabilization which those 1000 mm standard lenses lack, at less than an eighth of the price for the whole camera system when compared to even the standard 800 mm lens, say nothing about 1000 mm, which would be outside the photography budget of most. This more compact mirror lens also fits perfectly and snugly into a Lowepro cannister, a holster for easy access, which can, be attached to a belt or backpack waist band.

Rings in the bokeh, or defocused background, which has been a complaint of mirror lenses, with occasional rings seen in the highlights of the background, while the subject is in focus, is an artifact of the circular mirror in the front glass element of the lens, can be easily eliminated with Photoshop for a smooth background, so this is a thing of the past and there is not a disadvantage to using a mirror lens. If anything, the images have added novelty and texture to them. In reality, in the majority of the shots these rings in the background, a result of the different lens construction, are not visible, and if they are, because of the considerable zoom, they are considerably reduced in size and less noticeable, sort of a chain mail in the background.

At these magnifications, photographers will want to use the lowest F-stop possible, to use the maximum shutter speed to freeze the photo and eliminate blur, so the fixed Fstop of the mirror lens is not a concern, as it would have likely been set to the minimum possible f10 at all times anyway, even if there were other options. For zoomed in shots, I've found settings with minimum f stop to be optimal in almost all instances. Considering the f10 constraint, with this camera system, best results are achieved outside or in brightly lit spaces.

To get similar magnifications, a standard lens would need to use a 3× telextender, which, experience has shown, increases the imprecisely aligned glass interfaces, decreases clarity and reduces image quality or resolution significantly, while increasing the F-stop higher than a mirror lens, requiring the use of higher shutter speeds and ISO settings that both increase blur, grain, and undesireable noise many times again compared to the relative sharpness of the mirror lens. There's no comparison between the two.

Let me qualify this statement by saying that each camera system has its own unique advantages and specialties. However, for mega zoom, this system is unmatched at this moment I believe by any similarly priced system.

While they both have their advantages, through much experience and extensive testing, in some situations, the mirror lens significantly outperforms a high quality, more expensive Sigma 500 mm lens with an equivalent 2× teleconverter, and even without this telextender for distant subjects because with more magnification of the mirror lens, more of the megapixels are utilized and dedicated to capturing the subject, creating much greater resolution, especially considering the added benefit of the built in image stabilization heretofore not seen in lenses of this focal length. These mirror lenses equal or exceed the clarity of any lens I've tried at this distance.

So, experience shows the mirror lens is a better solution for clarity than the teleconverter or telextender combinations, because this adapter has no improperly aligned glass elements from combining two lenses which distorts the light during transmission like light hitting water.

Instead, for the equivalent of tripling of the 1000 mm without increasing the F-stop or aperture required (almost unheard of magnification) it is combined with either the 1.5× crop factor added to the 2× crop zoom of the Sony, or the doubling of the considerable 2× crop factor of the 4/3 Olympus camera's sensor. This effectively provides three times the magnification of the 1000 mm lens in the case of the Sony, and 2× in the case of the Olympus. This lens by itself already exceeds the longest standard lenses with image stabilization at 800 mm, so the mirror lens has effective magnification of 3000 mm or three times the bulkiest lens, all in a handheld system.

With the Sony Alpha DSLRs that have 1.5× digital crop factor, to start with the magnification is equivalent to 1500 mm at full 24 megapixel resolution, with increased magnifications of 1.4 or 2× crop zoom possible at the push of a button for 3000 mm optical zoom equivalent at about 12 megapixels, which is comparable to the Olympus E-5 flagship cameras resolution, however with about 1000 mm more additional zoom without introducing any of the blurriness caused by digital zoom which extrapolates pixels.

This new camera system detailed here is the equivalent of an alternate, more compact way, with lighter gear, of taking image stabilized, auto focus confirmed, sharp pictures with correct exposure at 3 variable zoom levels from 1500 mm to 3000 mm in the case of the Sony, and 2000 mm magnification in the case of the Olympus, which compare favorably with any powerful spotting optics. This mirror lens system can take clear snapshots with quality not impaired by teleconverters, with the curved parabolic mirrors of the mirror lens like contact lenses for correcting distant nearsighted vision. Teleconverters, by contrast, are somewhat like prescription glasses with sunglasses in front that obscure the view. Consequently, it is also important to unscrew the wavy UV filter that is sent from the manufacturer of the MTO lens which causes abberations and similar blurriness to achieve this clarity.

In the latest iteration, the camera system is providing equal or in my opinion at this point, is even exceeding the image quality, because of increased megapixel sensors and optical quality, of that seen in any available comparable standard system of this magnification. Due to camera advances, this mirror lens system provides the ability to take high quality pictures from distances previously not seen, literally, at least with this clarity, which will continue to improve with the megapixel race.

With the higher f-stop of the f10 lens, this lens system is intended and limited to daytime use, so noise with high megapixels at low light is not a concern. So, it's better to have more megapixels packed on a smaller sensor. However, if a sturdy tripod is employed ith proper technique and trigger release, for example, then it could be used in lower light as well.

A mirror lens takes in light at the front of the lens, bounces it off a curved parabolic mirror at the back to direct it and focus it forward to a central, circular mirror imbedded in the front lens glass element to reflect it directly back to the sensor, like a mirror solar collector array, thus reflecting the light upon itself for a lens and barrel that is half the length of a standard lens.

As a definition of terms, "dandelion chip" referred to above is also known as an auto focus confirmation chip, A.K.A., or goes by the abbreviated name of AF confirmation chip.

BRIEF SUMMARY OF THE INVENTION

The primary object of this invention is to allow a 1000 mm mirror lens to communicate f-stop and focal length information with the camera, in this case a Sony Alpha or possibly Olympus 4/3 at this point in time, so proper exposures can be obtained.

Another object is to create increased clarity, image stabilized photos with a supertelephoto mirror lens through proper calibration of the camera's image stabilization by programming the focal length, 1000 mm, into the dandelion chip.

Another object is to have accurate metering of such mega zoom photos through the imput of f-stop or aperture information of f10 into the adapter's dandelion chip for proper exposure through communication with the camera's computers.

Yet another object is to facilitate speedy and accurate manual focus almost as efficient as autofocus, through either outlining the subject with highlighting color aura of illuminated pixels in the electronic viewfinder that contrast with the background when the subject is in focus, called focus peaking, in the case of the Sony, or with a confirmation beep or light in the viewfinder, in the case of Olympus, when focus is achieved, ensuring sharpness isn't guesswork.

Another object of this invention is to provide a handheld camera system with essentially up to 3000 mm of effective zoom in the case of the Sony with 1.5× crop factor of the sensor and 2× crop zoom, or 2000 mm with the Olympus when factoring in the 2× crop factor of its sensor.

In addition, a unique object of the Sony is to provide three levels of variable zoom when taking advantage of the crop zoom feature, all at the touch of a button, from 1500 mm at highest resolution to 3000 mm at greatest zoom.

Finally, an object is to provide increased portability through a perfectly fitted Lowepro canister that seems to have been made for this setup, which functions as a holster with a loop around a belt or backpack waist strap for easy carrying.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a photographic machine which is a camera system that is a unique combination of three components designed to maximize clarity at very high zoom magnifications with great sharpness and exceptional 3000 mm mega zoom capability in addition to image stabilization, accurate metering, and auto focus confirmation comprising: A 1000 mm Rubinar or MTO Maksutov Cassegrain or other similar telephoto length mirror lens with m42 thread or other attachment, A m42 thread to Olympus 4/3 system mount adapter, a m42 to Sony, or other adapter of similar purpose, that threads to said lens, with an attached "dandelion chip" programmable with f-stop aperture of f10 for proper metering and 1000 mm focal length information for increased clarity through proper calibration of the image stabilization, while allowing the camera to recognize the lens and thereby enable an autofocus confirmation beep with Olympus, or Focus Peaking with the Sony to ensure confidence of proper, efficient focus without guessing. An Olympus 4/3 camera with a 2× crop factor sensor to effectively double the focal length and magnification, which attaches to the said adapter listed above with the Olympus mount twisting into place. A Sony camera is currently the other preferred option, providing 3 levels of zoom up to 3000 mm.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

1) The MTO Maksutov Cassegrain mirror lens with the circular mirror embedded in the glass of the front element.
2) The Sony camera body, in this case the A77, although the A65, A57 and A37 are all interchangeable with the Sony Alpha A mount and have varying specifications and corresponding price ranges, with the A37 still capable of 2× crop zoom and therefore impressive magnifications with a 16 megapixel camera at a more affordable price.

Figure 1:
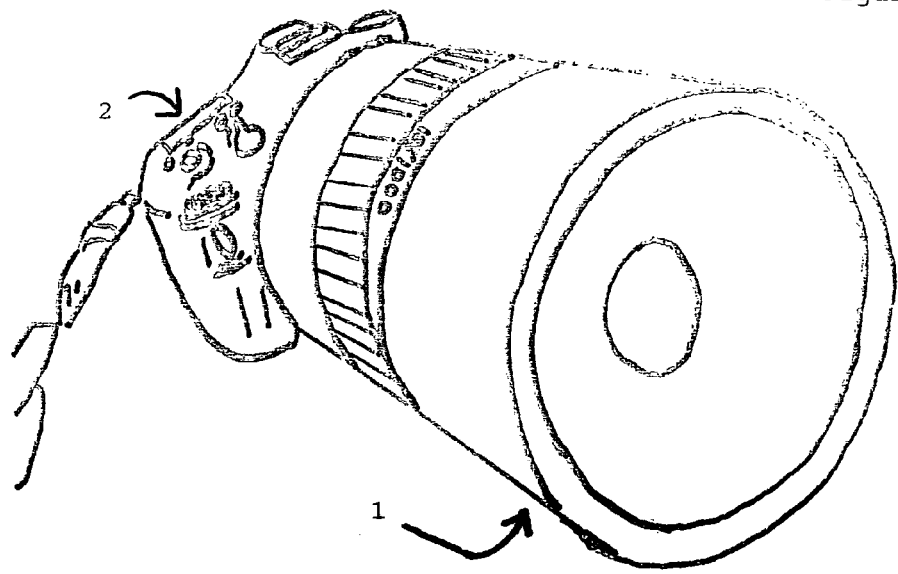
FIG. 1 is a perspective view of the fully functional and thoroughly tested invention showing the fully assembled camera system with all of the components. Visible in this view are.
Figure 2:
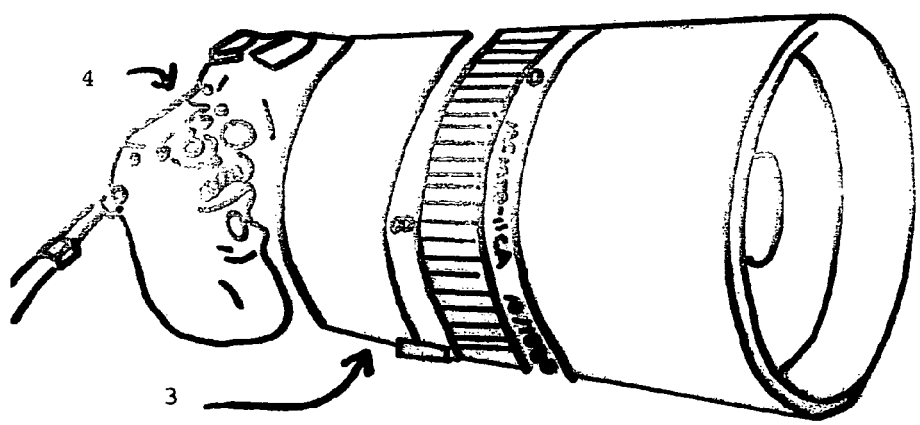

FIG. 2 is another perspective view of camera system from another angle showing:

3) The MTO F10 Maksutov Cassegrain 1000 mm mirror lens.
4) The Sony Alpha 77 camera.

Figure 3:
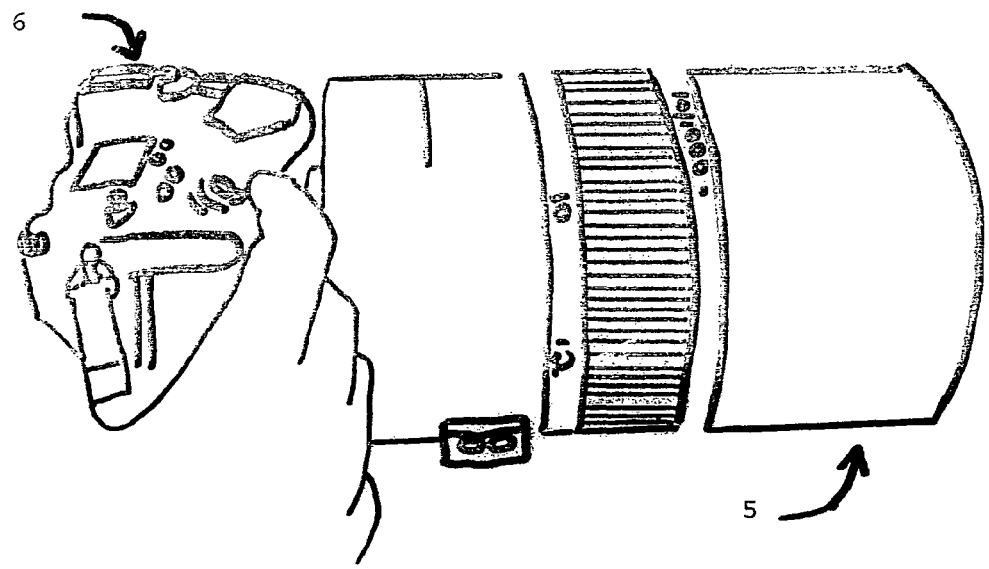

FIG. 3 is a perspective view of the camera system demonstrating the grip and the clearance for the fingers:

5) The 1000 mm mirror lens.
6) The Sony A77 camera body.

Figure 4:
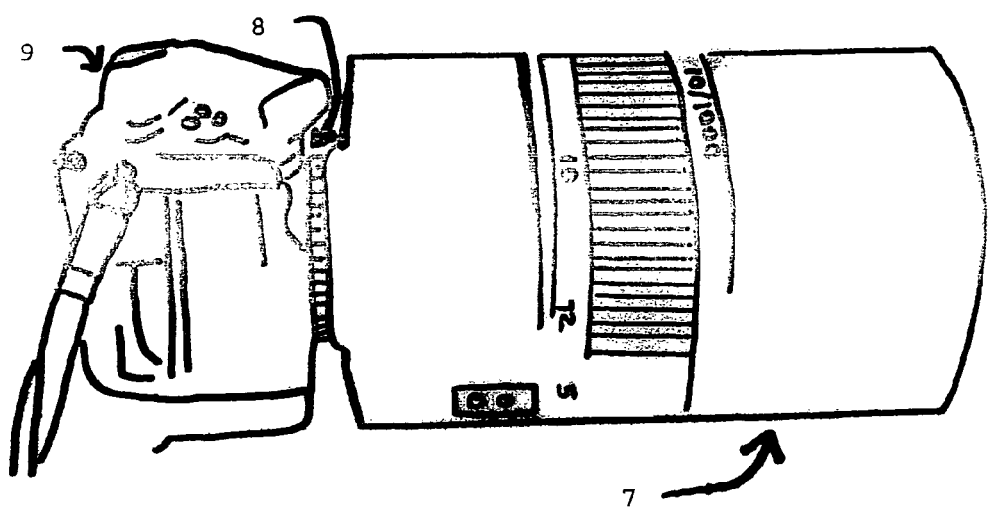

FIG. 4 is a perspective view of the camera system with all three components visible.

7) The 1000 mm mirror lens.
8) The m42 threaded Sony adapter with dandelion chip programmed with information for the camera about the focal length of the lens, 1000 mm, as well as the aperture, f10.
9) The Sony A77 camera body.

Figure 5:
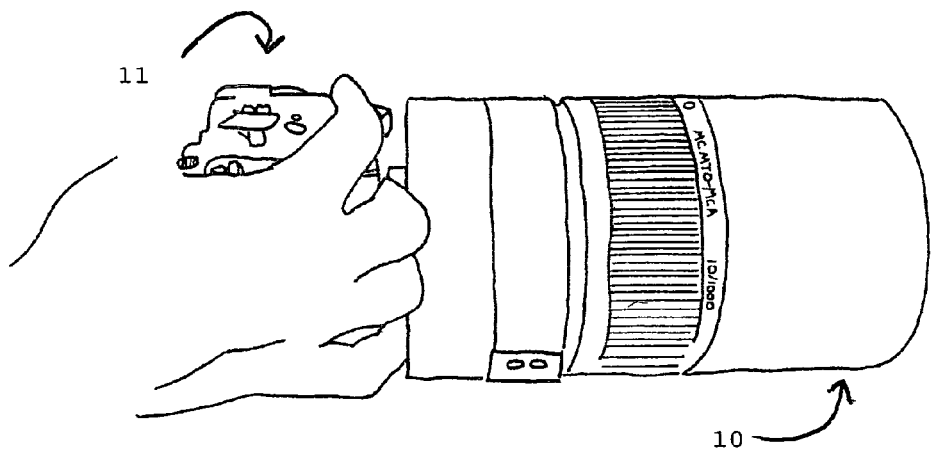

FIG. 5 is a perspective view with a second example demonstrating the camera's grip:

10) The 1000 mm mirror lens.
11) The Sony A77 camera.

Figure 6:
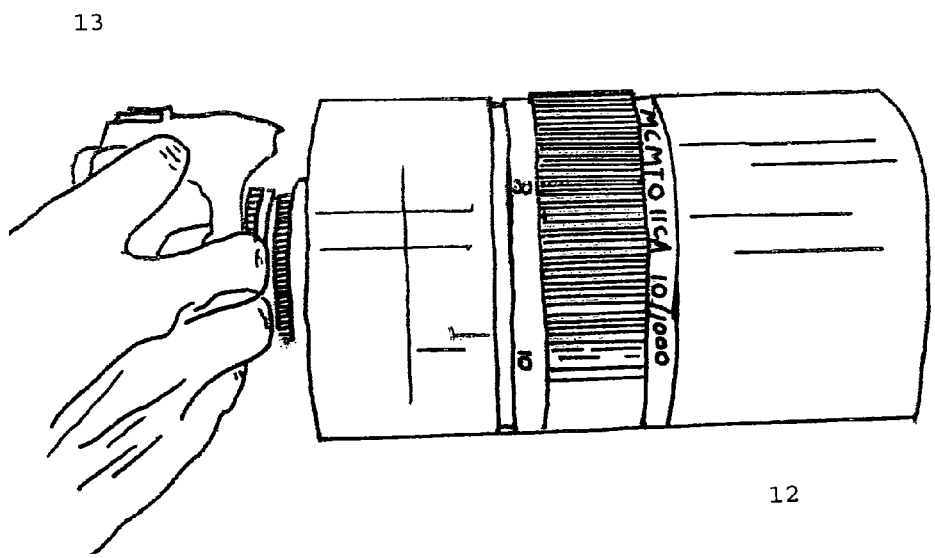

FIG. 6 is a perspective view of an alternate camera system using the same components with an Olympus camera instead, again demonstrating the grip, this time with greater clearance for the fingers.

12) The MTO 1000 mm mirror lens.
13) An Olympus E 620 camera body which would now likely be substituted with the equivalent flagship Olympus E-5 camera. The E-5 would replace the E620 since it is being phased out.

Figure 7:
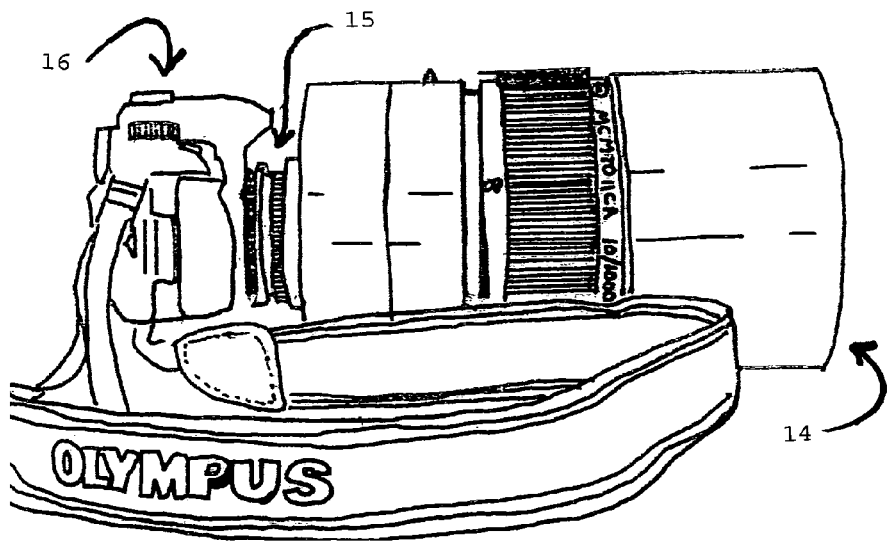

FIG. 7 is a perspective view of the alternative camera system showing the setup with all three components clearly visible.

14) The MTO 1000 mm mirror lens.
15) The M42 thread to Olympus mount adapter with a dandelion chip programmed with the focal length of the lens, 1000 mm, and its aperture, f10.
16) The E620 camera body, which in most cases would be substituted with the E-5, with a drawing of that camera following below.

Figure 8:
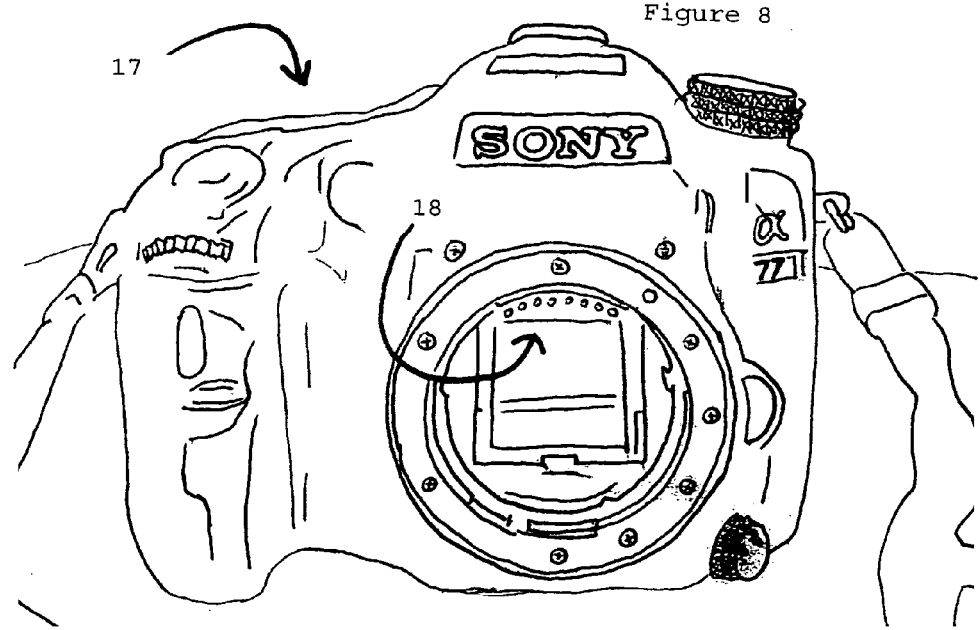

FIG. 8 is a perspective view of the Sony A77 camera body with 24 megapixel resolution showing the pins next to the A mount which press against the plates of the dandelion chip to communicate the focal length of 1000 mm and aperture of f10 information from the adapter to the camera ensuring proper image stabilization calibration as well as the right exposure. This camera is currently preferred for maximum resolution and zoom capability, although megapixels will inevitably increase.

17) The Sony A77 camera body.
18) The pins which communicate with the adapter.

Figure 9:
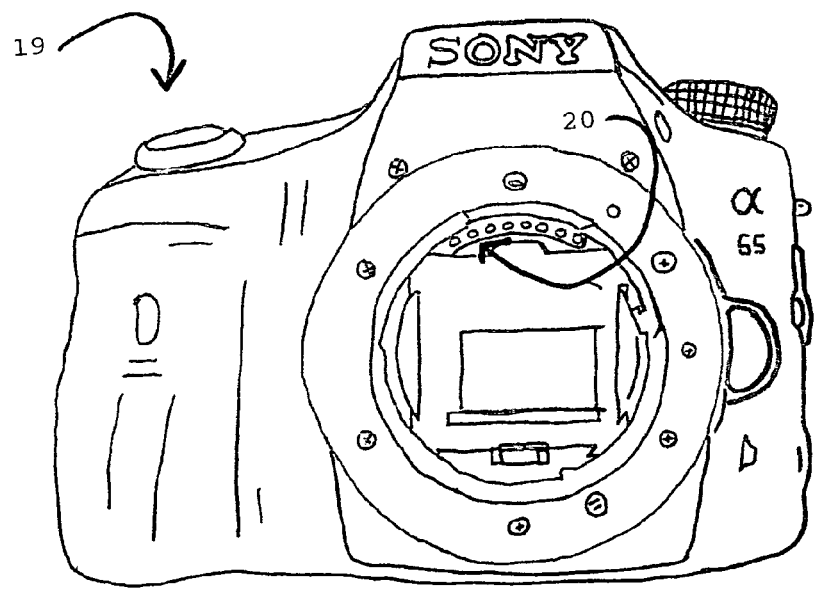

FIG. 9 is a perspective view of the Sony A65 24 megapixel camera and pins.

19) The A65 camera body.
20) The pins.

Figure 10:
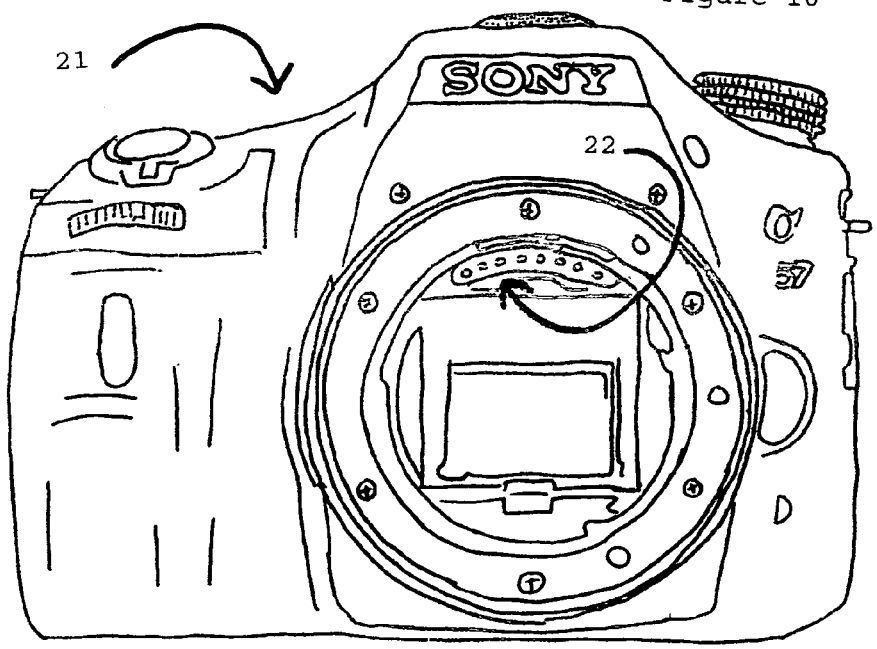

FIG. 10 is a perspective view of the Sony A57 camera and pins.

21) The A57 camera body.

22) The pins.

Figure 11:
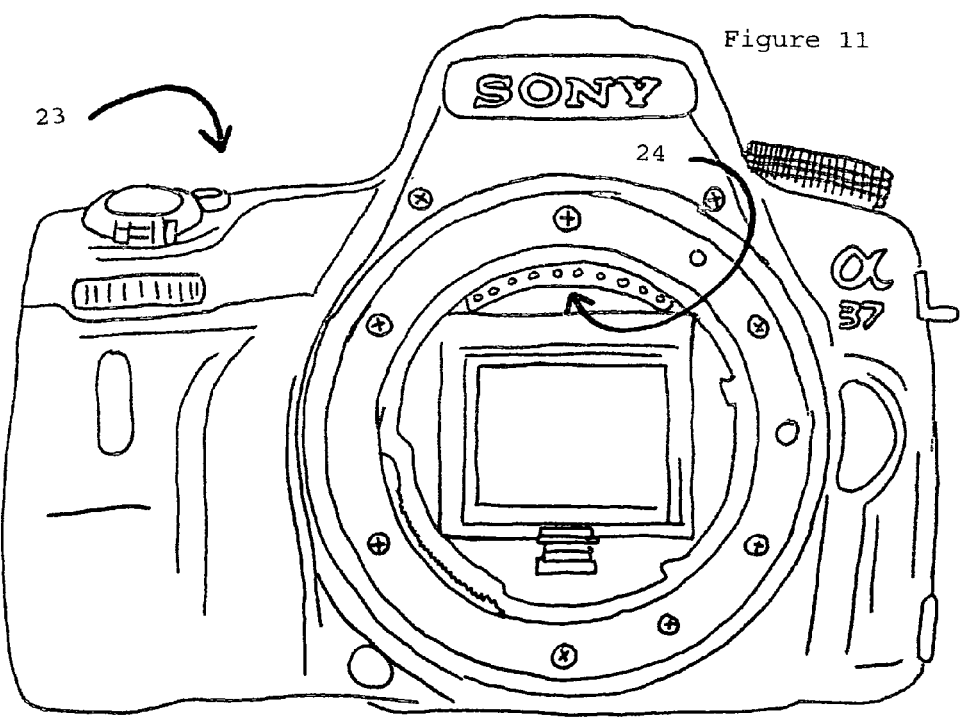

FIG. 11 is a perspective view of the Sony A37 16 megapixel camera and pins.

23) The A37 camera body.
24) The pins.

Figure 12:
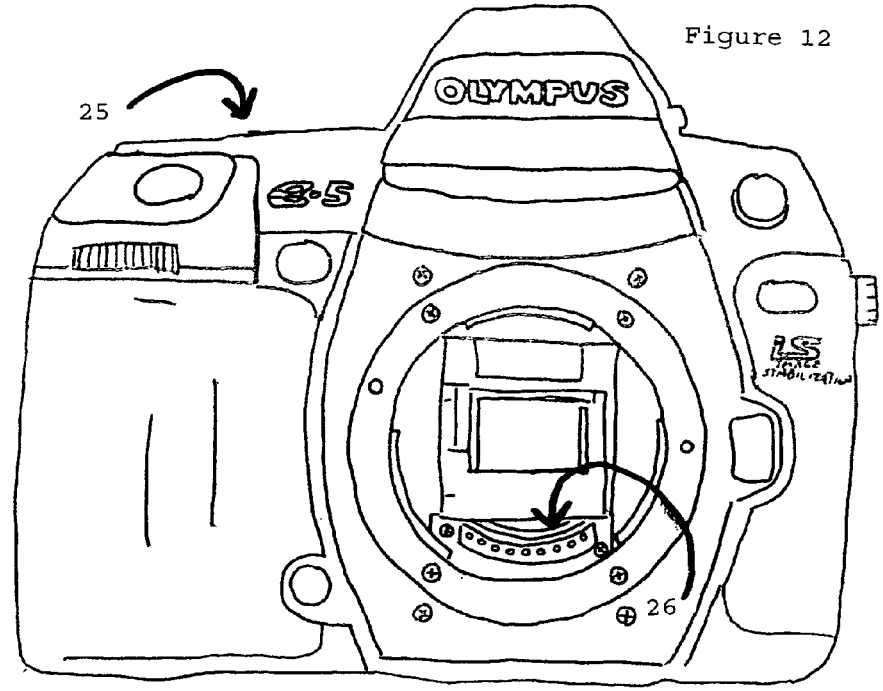

FIG. 12 is a perspective view of the Olympus E-5 with pins for the adapter to communicate the focal length 1000 mm and aperture of f10 to the camera to calibrate the exposure and image stabilization information correctly.

25) The E-5 camera.
26) The pins.

Figure 13:
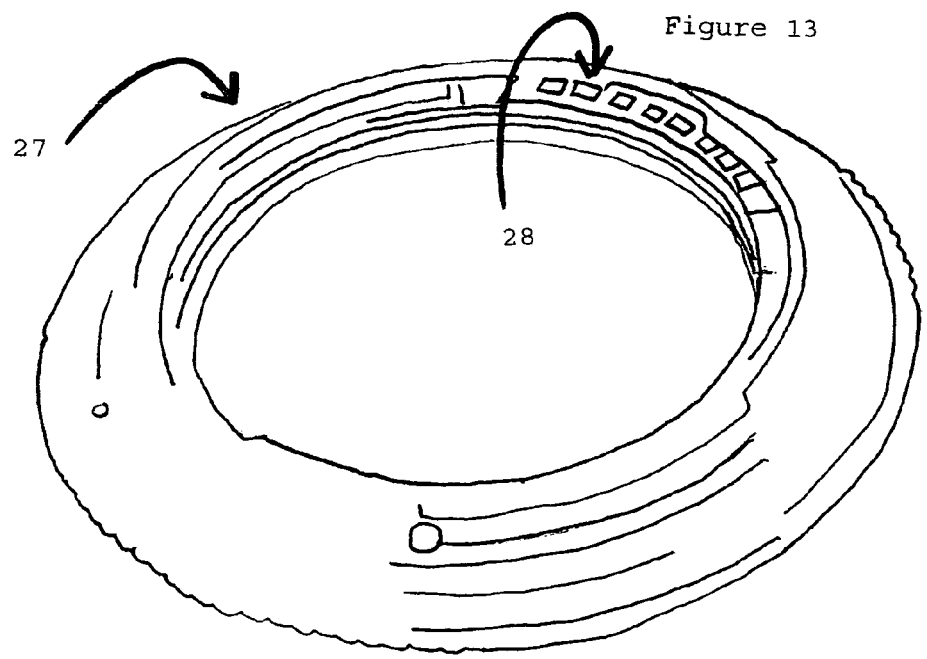

FIG. 13 is a perspective view of the m42 thread to Sony adapter with the programmable dandelion chip.

27) The M42 thread Sony adapter.
28) The programmable dandelion chip.

Figure 14:
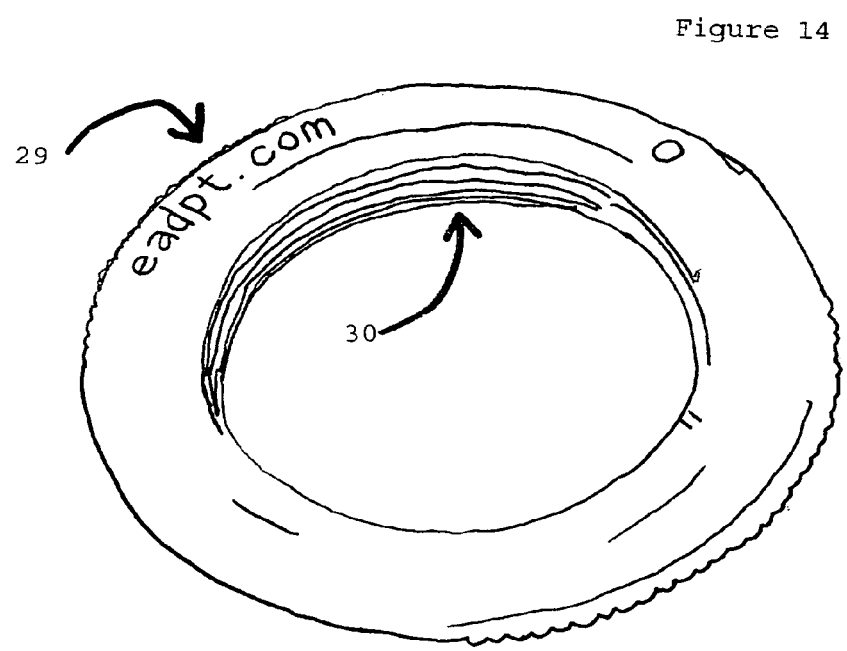

FIG. 14 is a perspective view of the M42 Sony adapter showing the threads to attach to the lens.

29) The M42 to Sony adapter.
30) The threads.

Figure 15:
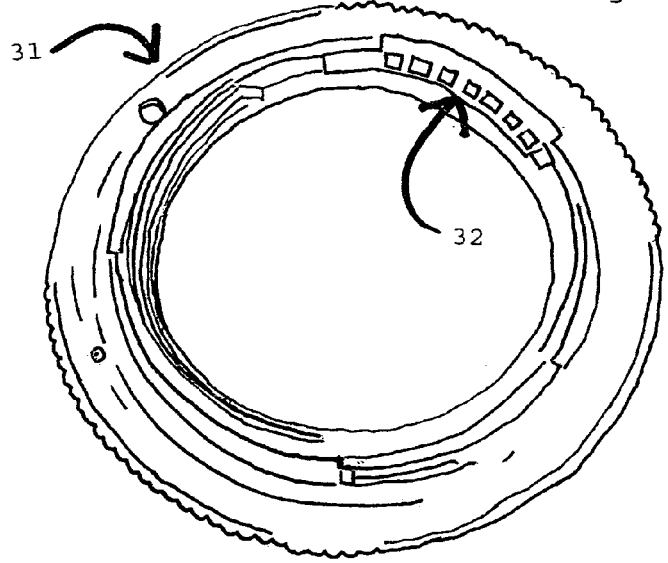

FIG. 15 is a perspective view of the M42 to Sony adapter with dandelion chip from another angle.

31) The M42 to Sony adapter.
32) The programmable dandelion chip.

Figure 16:
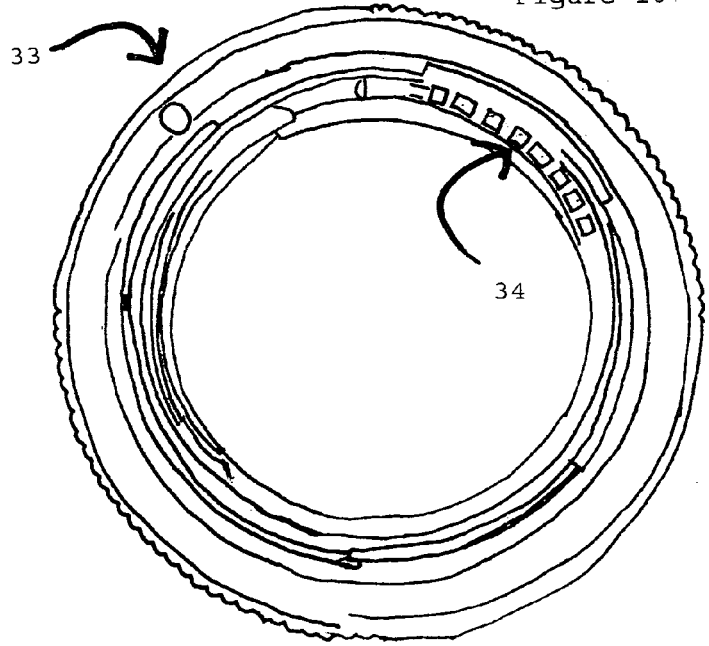

FIG. 16 is a perspective view with an enlarged, more detailed view of the same M42 to Sony adapter with dandelion chip.

33) The M42 to Sony adapter.
34) The dandelion chip.

Figure 17:
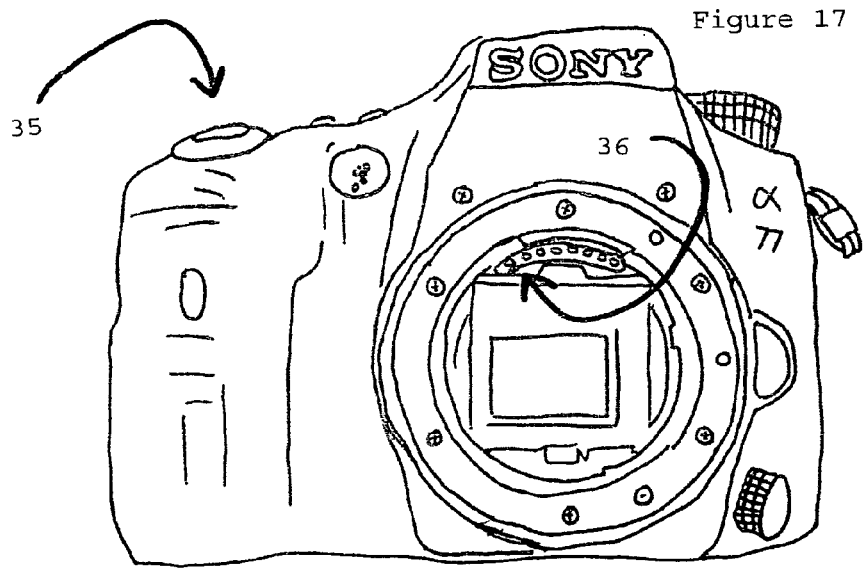

FIG. 17 is another perspective view of the Sony A77 from a slightly different angle, showing the pins so the adapter can communicate the focal length of 1000 mm and aperture information of f10.

35) The A77 camera.
36) The pins.

Figure 18:
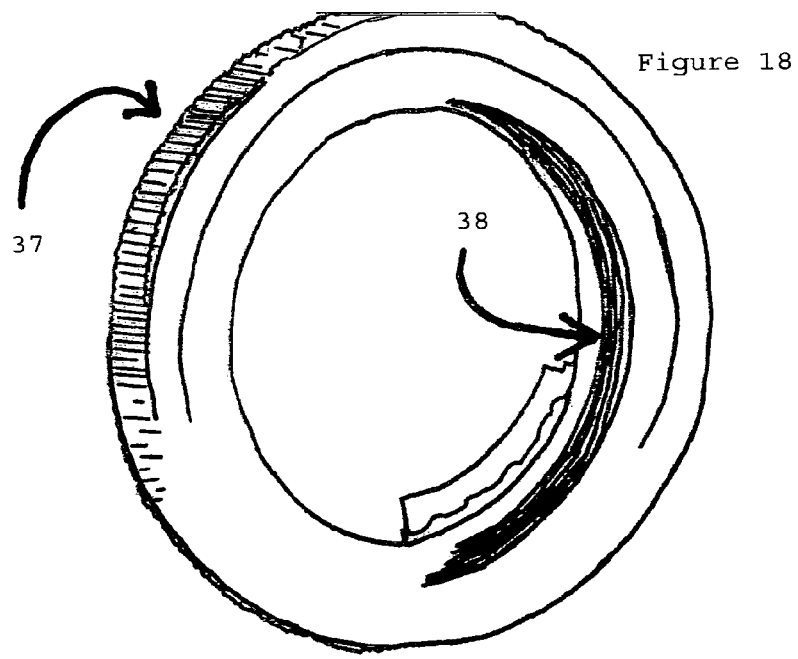

FIG. 18 is a perspective view of an M42 to Olympus adapter with programmable dandelion chip, otherwise known as an AF or autofocus confirmation chip, showing the threads to attach the lens.

37) The M42 to Olympus adapter.
38) The threads to attach the lens.

Figure 19:
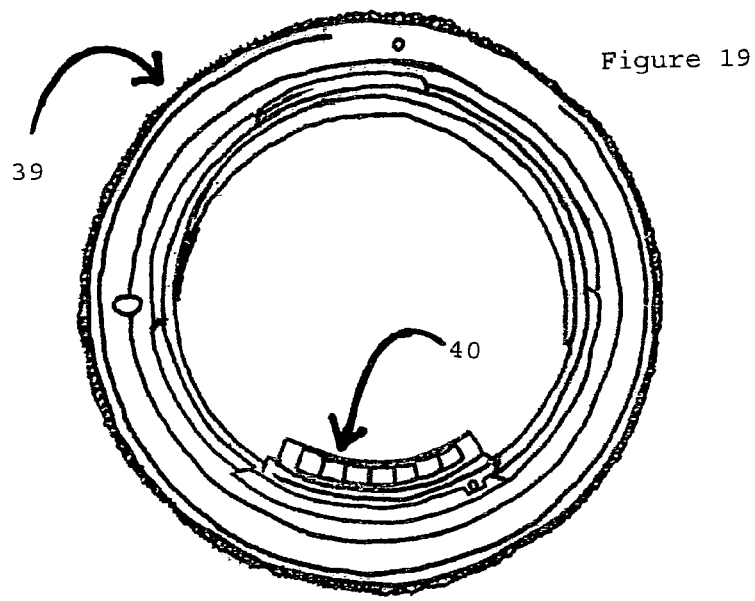

FIG. 19 is a perspective view of the M42 to Olympus adapter showing the dandelion chip programmed with aperture and focal length information of f10 and 1000 mm respectively.

39) The M42 Olympus adapter.
40) The programmable dandelion chip, otherwise known as an AF or autofocus confirmation chip.

Figure 20:
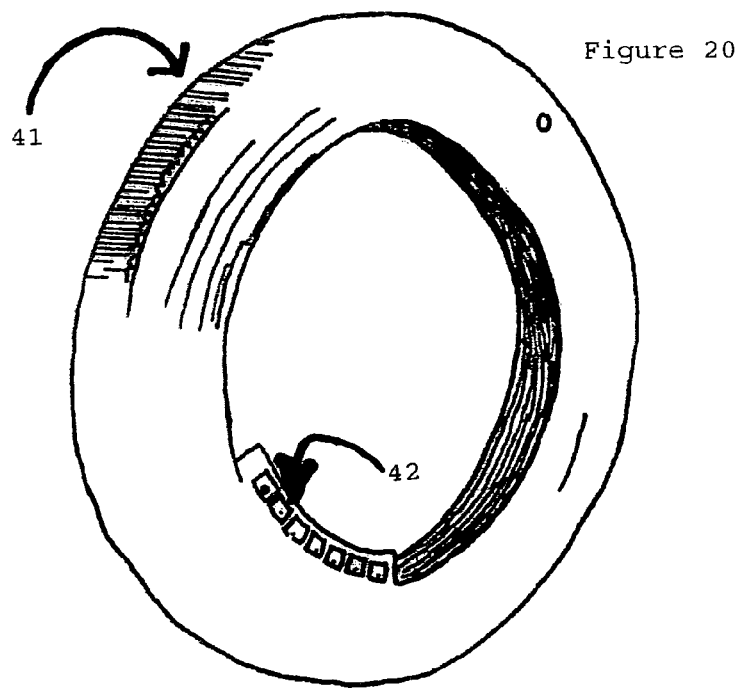

FIG. 20 is another perspective view of the M42 to Olympus adapter and dandelion chip.

41) The M42 Olympus adapter.
42) The programmable dandelion chip with metal plates that line up with the pins so the adapter can communicate aperture and focal length information to the camera.

Figure 21:
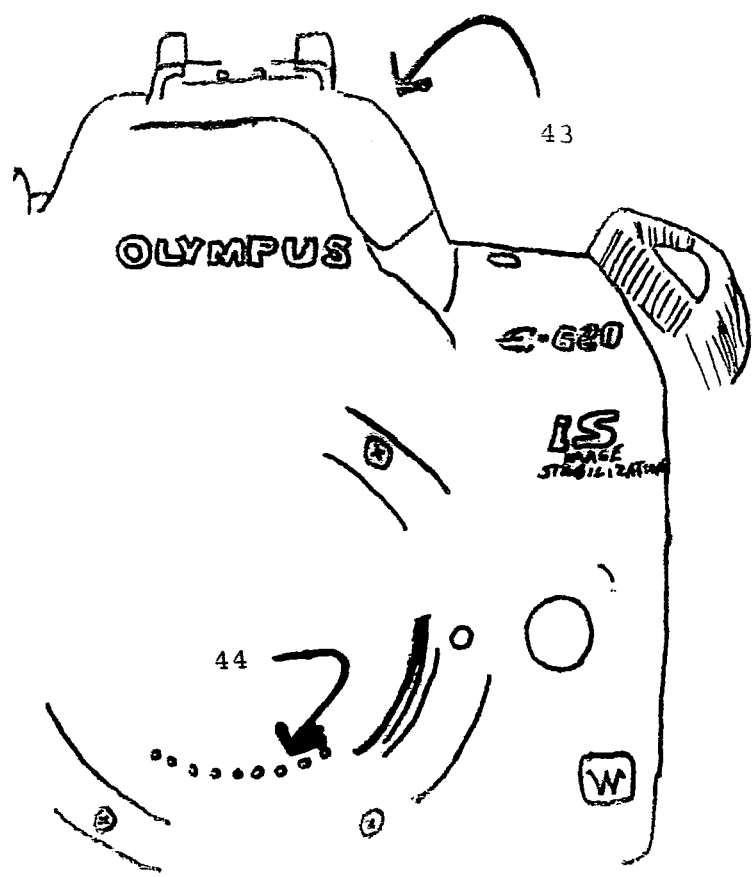

FIG. 21 is a perspective view of the Olympus E-620 camera showing the pins.

43) The Olympus E-620 camera.
44) The pins which align with the plates of the M42 to Olympus adapter to transmit the specifications of the lens.

Figure 22:
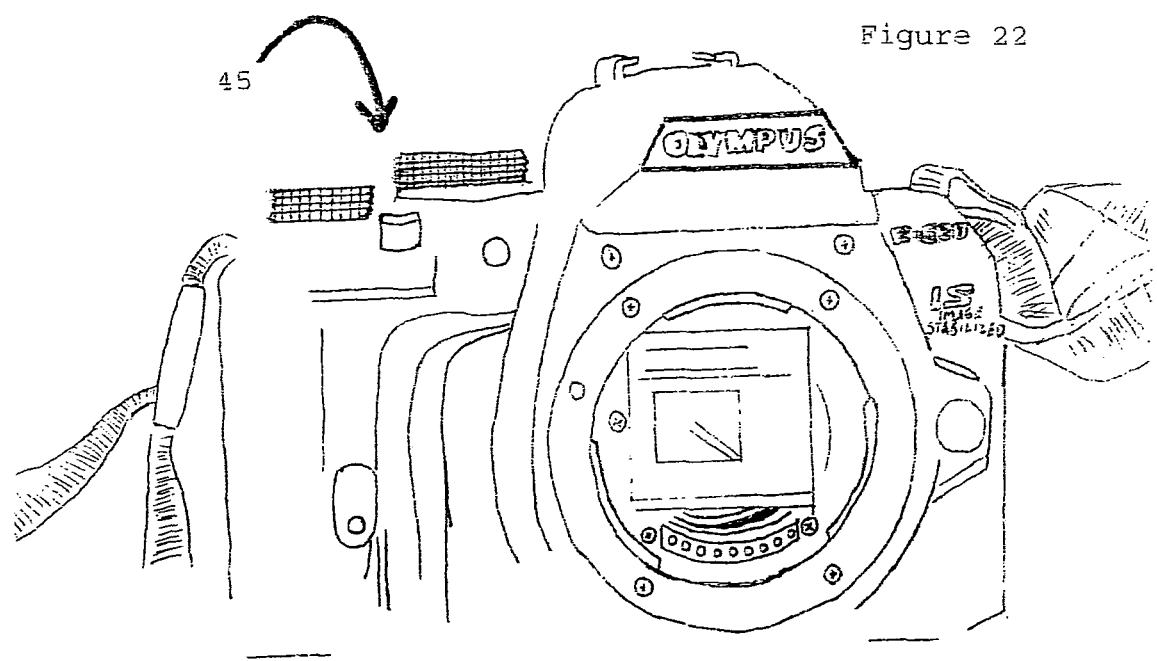

FIG. 22 is a perspective view of the Olympus E 620 camera, which is being phased out and replaced by the E-5 equivalent.

45) The Olympus E 620 camera.

Figure 23:
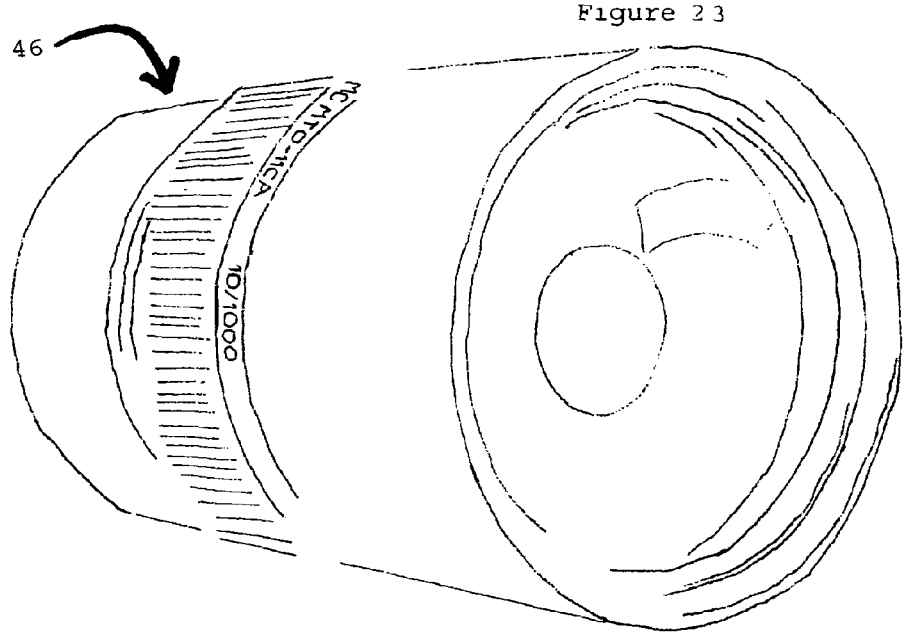

FIG. 23 is a perspective view of the MTO 1000 mm mirror lens showing the circular mirror in the front glass element.

46) The MTO 1000 mm mirror lens.

Figure 24:
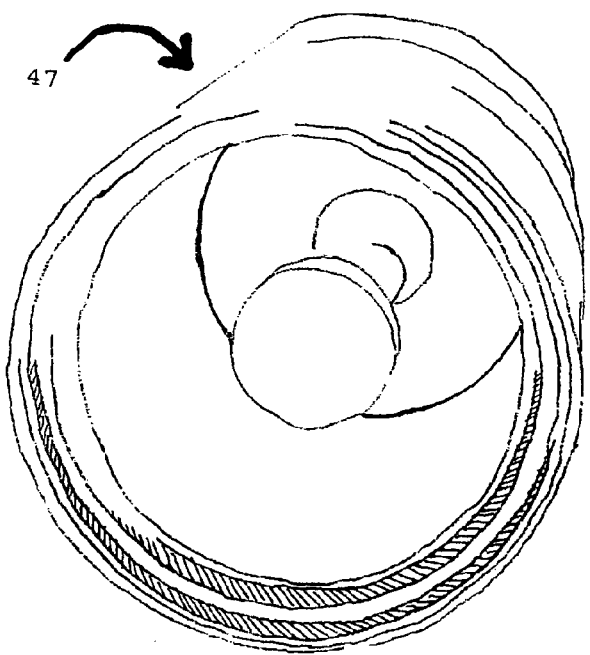

FIG. 24 is another perspective view of the MTO 1000 mm mirror lens.

47) The MTO 1000 mm mirror lens.

Figure 25:
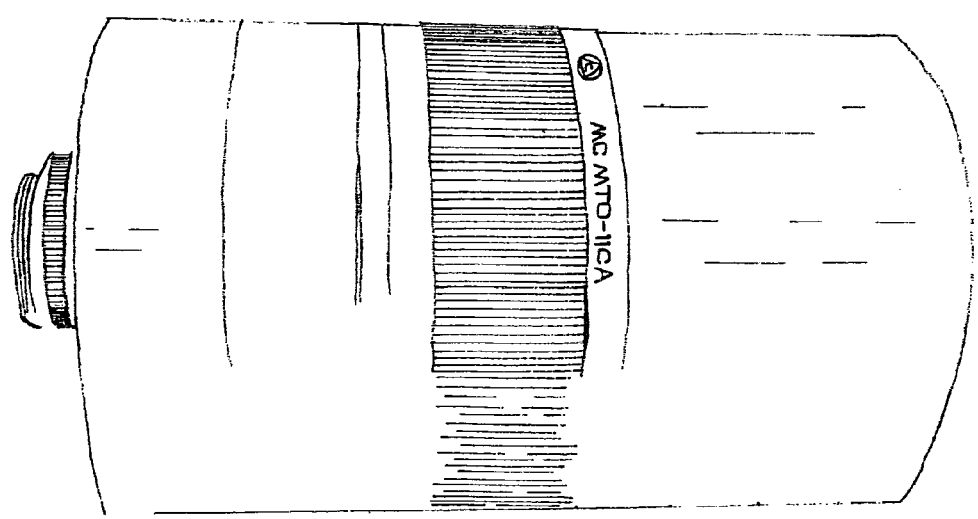

FIG. 25 is a perspective view of the MTO 1000 mm mirror lens from the side.

48) The 1000 mm mirror lens.

Figure 26:
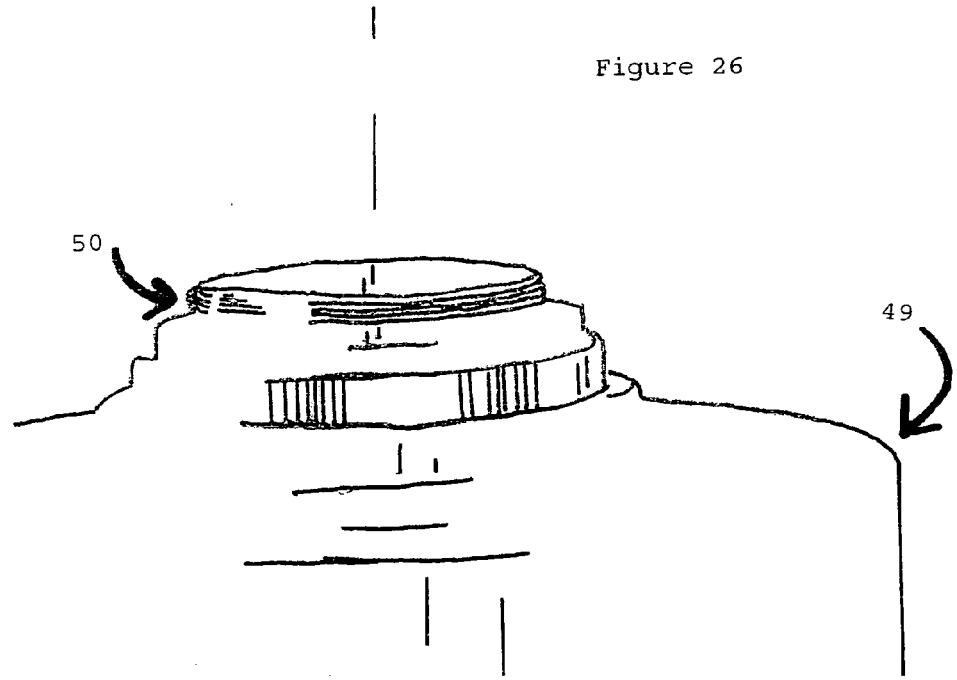

FIG. 26 is a perspective view which shows the threads of the 1000 mm mirror lens which screw to the adapter for later attachment to the camera.

49) The 1000 mm mirror lens.
50) The M42 threads.

Figure 27:
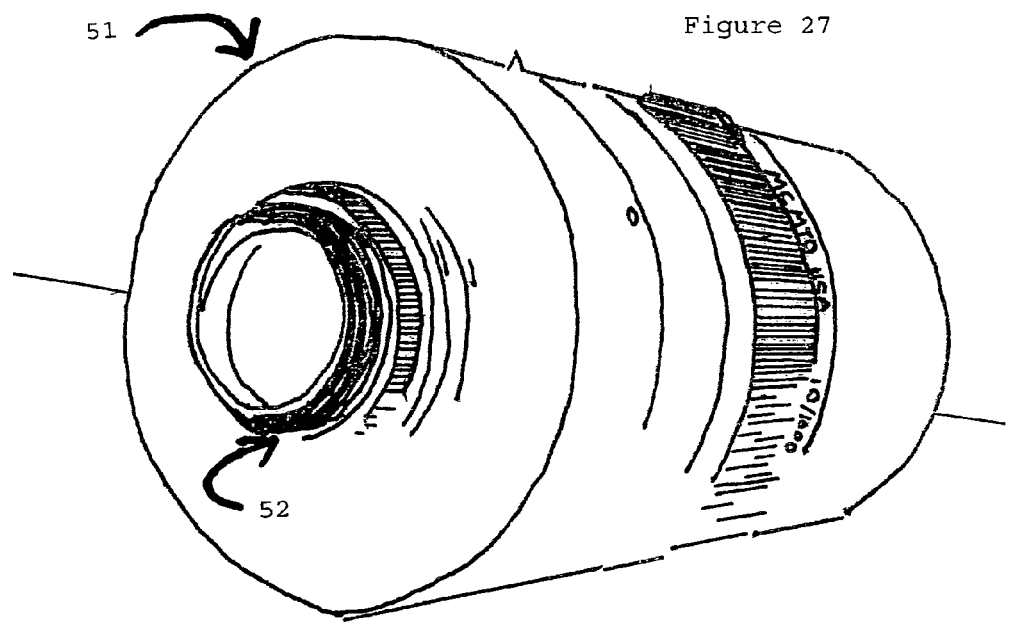

FIG. 27 is a perspective view of the M42 1000 mm mirror lens from another angle.

51) The 1000 mm mirror lens.
52) The threads.

Figure 28:
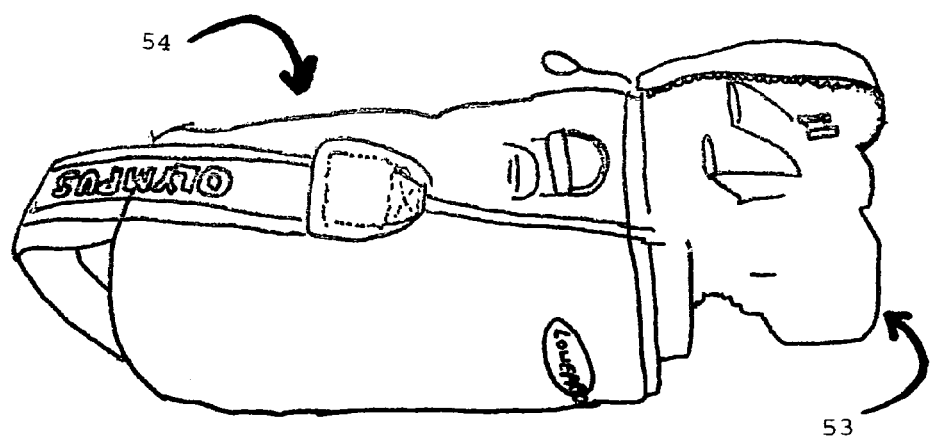

FIG. 28 is a perspective view of the camera system fit snugly within a Lowepro canister case. Although it is not essential to the fully functional camera system, it does help ease the burden of transport considerably with a holster from the hip and is the preferred method of carrying the camera long distances at this time, while ensuring it is still available for last minute photos.

53) The camera system.
54) The canister holster case for the camera.

RELATED

This invention is a more detailed description and an update incorporating new technology substitutions as the previous camera technology is being phased out and becoming obsolete since the original patent application Ser. No. 12/804,555 filed on Jul. 24, 2010, A photographic machine comprising a camera system with exeptional 2000 mm mega zoom lens magnification capability with image stabilization, accurate metering, and auto focus confirmation.

At the time, not all of the improvements in the technology could have been fully anticipated, although they may have been hinted at. Now, the title has been altered to incorporate 3 variable levels of zoom from 1,500 mm to 3,000 mm, for instance.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

As has been noted, this camera system comprises a 1000 mm mirror lens combined with a Sony Alpha A77, preferably, or Olympus 4/3 camera each with its own unique programmable dandelion chip adapter, which makes the image stabilization and metering fully functional as well as converting it almost to an autofocus lens in some instances, with either focus peaking, which outlines the subject in a bright aura of illuminated pixels in the viewfinder when it's in focus, in the case of Sony, or with the help of an autofocus beep when correct focus is achieved, in the case of Olympus. With the Olympus camera, it is possible to "catch in focus", so that the camera will automatically take the picture as the barrel of the lens is rotated when the subject is in focus. To accomplish this, the Maksutov Cassegrain 1000 mm MTO, Rubinar, or other equivalent quality supertelephoto mirror lens, (48), is attached by turning it to screw the M42 threads snugly to the adapter (27) in the case of Sony or (39) in the case of Olympus, with a programmable dandelion chip (28) in the case of the Sony adapter or (40) with the Olympus adapter. With this adapter, the camera will recognize the lens specifications and will automatically calculate the correct parameters for exposure with its computer. The lens with the Sony m42 adapter can now be turned onto the body of the camera (17) in the case of the flagship Sony A77, or the M42 to Olympus adapter turned to the Olympus E-5 (25) manufactured by Olympus, until it locks with a pin like any Sony Alpha A mount or Olympus 4/3 mount lens. (A Pentax camera could be substituted to maintain in-camera image stabilization, although they currently lack the dandelion chip adapter). When the m42 adapter with lens attached is rotated into place with the Sony Alpha A mount or the Olympus 4/3 mount of the camera, then in both instances, the respective metal plates of the dandelion chip (28) in the case of the Sony, or (40) in the case of the Olympus, will align with the pins of the camera body (36) in the case of the Sony or (44) in the case of the Olympus, allowing for communication of the information about the lens including the focal length of 1000 mm, to enable proper image stablization and f10 aperture for proper exposure calculations.

Sony dandelion chips come preprogrammed with this information from the factory that manufactures the adapter. In the case of the Olympus, when the lens with adapter is securely attached to the camera body, then, enter the camera's programming mode and imput the focal length and aperture of the lens following the instructions of that manufacturer. Now, properly calibrated in-camera image stabilization, correctly calculated metering for exposure, and focus peaking for focus confirmation in the case of the Sony, or the autofocus confirmation beep or "catch in focus" feature in the case of the Olympus, which is virtually an autofocus function with manual turning of the lens, are all activated together in concert for optimal automated photographs with all of the modern features that photographers have become accustomed to by performing all the calculations and functions in the camera. All this is accomplished with a very sharp lens that has mega zoom abilities, a lens which independent from the rest of the camera system lacks the synergy of these modern conveniences, so the system is greater than the sum of its parts in a sense.

Previously, without such an adapter, only some of the features may have been enabled, and likely with the wrong information. With the camera assuming wrong focal length data for example, it would either not function at all, in the case of the Sony, possibly, or not cancel camera shake as effectively because of the wrong information assumptions of the camera's computer. Mega zoom lenses require more exaggerated correction and motion of the sensor to reduce blur, presumably, because any shake of the photographer is magnified by the increased zoom. Without the support of a monopod, sharply focused photos would be impossible with a standard, traditional camera at these focal lengths, and it would be too heavy for anyone to carry handheld.

However, with the image stabilization in operation and this more compact camera system, sharp hand held photos are possible even at these extremely great magnifications.

While a traditional lens of this zoom level would be prohibitively, and awkwardly far away from a person's center of gravity for their spine to support, this camera setup, by contrast, with the shortened barrel and reduced glass lens elements to lighten it further, it is possible for a person in proper physical shape to accomplish the task of a handheld shot with relative ease. For more than one shot, or to assure sharpness, a monopod is the preferred method to take many photos. The monopod carries the weight of the camera system. Extra stabilizing from the monopod will further ensure clarity, while still allowing maneuverability and fast set up since it is a pivoting one point support instead of three, much quicker to extend on uneven surfaces and terrain.

To efficiently achieve crisp or sharp focus in the case of the Sony, enable focus peaking through the camera's menu system in a color of choice that contrasts the background, then turn the focus ring or barrel until hint of an outline or aura of illuminated pixels of this color indicator is seen around the subject or surrounding subjects near its location in the electric viewfinder screen. Then, the scene is in focus and the photo can be taken without taking the time for guesswork, indecision, human error or vision that is less than 20/20. If an aura or outline is not apparent in the electric viewfinder, press the button to turn on the LCD screen on the back of the camera to enlarge the view. On that larger screen, the aura or a hint of highlighted pixels will be visible. Then, take the photo. This technique has been thoroughly field tested through trial and error and is the most effective and consistently repeatable method of focus confirmation with the Sony without further calibrations necessary.

In the case of the Olympus, in order achieve proper focus, turn the focus ring while pressing the shutter button down halfway (while in the camera's S-AF mode, as an example in this particular camera, the E-620, though it will vary). Push the button halfway and release it repeatedly while turning the barrel of the lens, until there is a beep. When in proper focus, there will be an audible beep, indicating optimal focus and sharpness, at which point the shutter is depressed completely for the shot. Admittedly, this takes some practice and can be a little tricky, though it allows the photographer to fine tune the focus once they hear the beep. However, there is an easier, automated way. Recently, through extensive field testing, an alternative method which is easier and more straightforward has been discovered which is almost equivalent to autofocus. This is to configure the camera so that the shutter only releases when the subject is in focus, called "catch in focus". In that case, the procedure is simpler. Depress the button fully when the subject is out of focus and turn the barrel in the direction the photo becomes less blurry. If there is sufficient daylight, the shutter will fire automatically when the subject is in focus.

After much experimentation with every other type of telextenders and teleconverters with glass elements over the course of a decade, I found this newly devised camera system has a superior combination of maximum zoom and clarity, 3000 mm magnification when the effective crop factor and crop zoom feature are added, in the case of the Sony, or 2000 mm in the case of the Olympus.

Sony's A77 currently exceeds the megapixels of other cameras in this price range. At their maximum zoom levels, considering it's a crop zoom, the Sony and the Olympus will have roughly equivalent megapixel counts or resolution at around 12, though the Sony has 1000 mm extra zoom. In addition, the Sony offers three levels of zoom from 1,500 to 3,000 mm at the push of a button through "crop zoom" or focusing the power of the lens on less of the sensor surface.

This mirror lens setup can be handheld at low ISOs, usually 200 or 400 in daylight, sufficient for very sharp photos without noise of higher ISOs, because of the shorter barrel, lighter weight, and image stabilization allowing clear photos at lower shutter speeds. Shooting handheld is a significant speed advantage for fleeting, quick shots, with the added bonus of efficient, quicker focus confirmation for peace of mind when taking the photograph, to ensure it is sharp.

All this is accomplished at a more affordable price, an eighth or less of what a similar, standard autofocus lens alone of a similar zoom range would run, with the standard massive lens still having 200 mm less magnification, almost the equivalent of a 1.4× telextender. 1000 mm standard lenses with autofocus are astronomically priced and still lack image stabilization.

This more manageable mirror lens also has less inertia when swinging toward the target so the subject can be brought into view more efficiently and with less effort.

Plus, with the mirror lens it is not necessary to use of telextenders which experience has shown have too many imprecise glass surfaces at two joints between the lens and the teleconverter, like wearing two pairs of prescription glasses simultaneously, that reduce clarity and light transmitted to the camera significantly, meaning that higher ISOs, more noise and less clear photos with the standard setup. With the mirror lens there is no loss of clarity of the teleconverter, so the precise reflective mirror maintains the sharpness at very long distances.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A photographic system configured to maximize zoom magnification and picture clarity with one or more levels of zoom, providing image stabilization, accurate metering, and auto focus confirmation, comprising:
    a camera;
    a telephoto length mirror lens with a thread attachment configured to screw into a camera mount adapter;
    the camera mount adapter which includes one or more electronic connectors on a non-transitory programmable autofocus confirmation chip, the camera mount adapter further including threads that screw onto the telephoto length mirror lens; and
    the programmable autofocus confirmation chip attached to the camera mount adapter, which is uniquely programmed with one or more specifications of the lens, the programmable autofocus confirmation chip being programmable to convince the camera that the telephoto length mirror lens is a known system lens, such that camera functionality provided to known system lenses is provided when using the telephoto length mirror lens, the programmable autofocus confirmation chip being further programmable with f-stop information for proper metering and focal length information for image stabilization respectively, wherein this focal length information calibrates the appropriate amount of image stabilization necessitated by the telephoto length mirror lens, and wherein this focal length information exaggerates sensor shift to counteract any determined magnifications of shake from the telephoto length mirror lens, and wherein the focal length and f-stop information is communicated and transmitted from the programmable autofocus confirmation chip electronic connectors through one or more contact pins of the camera to calculate an appropriate exposure and increase clarity using image stabilization.

2. The photographic system of claim 1, wherein the programmable autofocus confirmation chip is attached to the camera mount adapter with an attached 1000 mm telephoto length mirror lens, which turns onto the camera body and locks into place, such that the electronic connectors of the autofocus confirmation chip contact the contact pins in the camera to communicate aperture and focal length information.

3. The photographic system of claim 1, further comprising programming the programmable autofocus confirmation chip to automatically, without user input, adjust camera settings including f-stop information for proper exposure, and focal length information for activating image stabilization, wherein the programmable autofocus confirmation chip relays the programming information to the camera to enable automatic appropriate exposure calculations and metering readings using the camera's internal processor, and further enables appropriate image stabilization compensation to counteract camera shake.

4. The photographic system of claim 1, wherein the camera mount adapter is affixed to a specified camera lens, the electronic connectors of the camera mount adapter allowing information to pass between the camera and the adapter for the implemented lens, such that the lens specifications are transferred from the programmable autofocus confirmation chip to the camera body's internal processor for calculations for the appropriate exposure and image stabilization.

5. The photographic system of claim 1, wherein by combining the 1,000 mm optical zoom of the 1,000 mm telephoto length mirror lens, the camera sensor's built in, fixed 1.5 times crop factor or focal length multiplier and additional optional crop zoom feature at the touch of a button on the camera body, for variable or multiple levels of zoom, at least one of the levels of zoom comprising 1,500 mm to 3,000 mm.

6. The photographic system of claim 5, further comprising combining the optical zoom of the 1,000 mm telephoto length mirror lens, the camera sensor's built in, fixed 2 times crop factor or focal length multiplier, and additional, crop zoom feature at the touch of a button on the camera body, for variable or multiple levels of zoom, at least one of the levels of zoom comprising 2,000 mm-4,000 mm.

7. The photographic system of claim 1, further comprising an adapter with an attached autofocus confirmation chip to adapt the 1000 mm telephoto length mirror lens to one or more mirrorless cameras.

8. The photographic system of claim 1, further comprising an adapter with an attached autofocus confirmation chip to adapt the telephoto length mirror lens to one or more Digital Single Reflex Lens or DSLR cameras with built in fixed 1.5 times or 1.6 times crop factor or focal length multiplier sensors to increase effective zoom, as the direct view through the lens via the mirror allows users to see fainter subjects at low light.

9. The photographic system of claim 1, wherein the preprogrammed specifications of the autofocus confirmation chip comprise 1000 mm focal length and f10 f-stop information.

10. The photographic system of claim 1, wherein the programmable autofocus confirmation chip further allows the camera to implement focus peaking, activating this advanced feature, which outlines a subject in illuminated pixels indicating that it is in focus.

11. The photographic system of claim 1, wherein the same functionality provided to the camera system when using known system lenses is also provided to the camera system by uniquely using the programmable autofocus confirmation chip, with an attached 1000 mm telephoto length mirror lens, comprises focus peaking.

12. The photographic system of claim 1, wherein the same functionality provided to the camera system when using known system lenses is also provided to the camera system with attached 1000 mm telephoto length mirror lens by using the programmable autofocus confirmation chip, comprises automatic activation of image stabilization without further user input.

13. The photographic system of claim 1, wherein the same functionality provided to the camera system when using known system lenses is also provided to the camera system with attached 1000 mm telephoto length mirror lens by using the programmable autofocus confirmation chip, comprises automatic activation of appropriate metering and exposure readings without further user input.

14. The photographic system of claim 1, wherein the same functionality provided to the camera system when using known system lenses is also provided to the camera system with attached 1000 mm telephoto length mirror lens by uniquely using the programmable autofocus confirmation chip, comprises in-body image stabilization (IBIS) calibration.

15. The photographic system of claim 1, wherein the same functionality provided to the camera system by known system lenses is also provided to the camera system with attached 1000 mm telephoto length mirror lens by uniquely using the programmable autofocus confirmation chip, comprises autofocus confirmation.

16. The photographic system of claim 1, wherein the programmable autofocus confirmation chip further allows the camera to recognize the specifications of the 1000 mm telephoto length mirror lens through electronic input of appropriate f-stop and focal length information values passed along through electronic connectors to the camera's internal processor, and which enable an autofocus confirmation beep and light in the viewfinder or LCD display and further enables a catch in focus which itself comprises an autofocus type feature with the camera's settings such that with the manual turning of the lens barrel, the camera automatically takes a picture when the subject is in focus within the selected target area of the viewfinder.

17. The photographic system of claim 1, wherein the autofocus confirmation chip uniquely activates one or more advanced features of the camera system with attached 1000 mm telephoto length mirror lens, including focus peaking.

18. The photographic system of claim 1, wherein the autofocus confirmation chip uniquely activates one or more advanced features of the camera system with attached 1000 mm telephoto length mirror lens including automatic image stabilization without necessitating manual user input of the focal length values through the camera menus.

19. The photographic system of claim 1, wherein the camera comprises a digital single-lens reflex camera.

20. The photographic system of claim 1, wherein the photographic system is implemented in an interchangeable lens video system with attached 1000 mm telephoto length mirror lens that uses the camera mount adapter and an attached autofocus confirmation chip to activate advance features mentioned above, with a the dedicated video camera in place of a dedicated photographic camera.

21. The photographic system of claim 1, wherein the camera has any crop factor or focal length multiplier sensor along with an activatable and adjustable crop zoom which operates at one or more zoom levels at the touch of a button on the camera body, with the autofocus confirmation chip focal length information calibrating the correct amount of image stabilization.

22. The photographic system of claim 1, with a fixed 2× crop factor or focal length magnifier sensor built in to the camera that automatically effectively doubles the focal length or magnification, and further comprising incrementing the camera system with an optional additional two or more levels of zoom with the 2 times or any determined crop zoom at the touch of a button on the camera, for variable, discrete zoom levels, up to 4,000 mm or more of effective zoom, at half or less of the megapixel resolution, where the appropriate amount of image stabilization is maintained at all zoom levels by the camera's computers or internal processors which calculate the amount of compensation with the focal length information provided through the electrical connectors from the autofocus confirmation chip attached to the adapter.

23. The photographic system of claim 1 with a fixed 1.5 times crop factor or focal length magnifier sensor built in to the camera, further comprising an additional 2× or any determined crop zoom at the touch of a button on the camera for variable discrete zoom levels, up to 3,000 mm or more of effective zoom at half or less of the megapixel resolution, where the appropriate amount image stabilization is maintained at all zoom levels by the camera's computers or internal processors, which calculate the amount of compensation with the focal length information provided through the electrical connectors from the autofocus confirmation chip attached to the adapter.

24. The photographic system of claim 1 where in addition to any amount of the camera's fixed built in crop factor or focal length multiplier specification of the sensor, which essentially increases effective zoom, further, additional crop zoom levels are available at the touch of a button on the camera body while maintaining full HD or 4K standard resolution at 2, 4, or any determined additional times crop zoom magnification levels by using proportionally less of the central sensor surface, where with an inverse relationship of less pixels equates to more zoom, still with sufficient pixels for standard, HD or 4K video recording which is less pixel intensive than the higher resolution photographic stills, wherein the autofocus confirmation activates advanced features such as automatic input of the focal length information to maintain proper image stabilization calibration and compensation for the various levels of zoom described herein.

25. The camera system of claim 1, which further has the option of including an extension tube that still allows focus to infinity, with electrical contacts and connecting wires within to pass along or relay the information from the autofocus confirmation chip and the 1000 mm telephoto length mirror lens to the camera body, without the extension tube including optical glass elements which reduce available light, the extension tube further acting as a spacer between newer, smaller, more compact diameter standard mirrorless mounts and the previous standard mount adapters mentioned above, which also allows more space between the various camera's variably projecting camera grips and the wide 1000 mm telephoto length mirror lens, thereby increasing clearance for the fingers, with the extension tube tapering from the wider previous standard diameter autofocus confirmation adapter with 1000 mm telephoto length mirror lens via extension tube adapter which takes that was occupied by the camera's reflex mirror of previous DSLR camera versions to adapt to the newer, smaller diameter more compact mirrorless camera mount standards with the extension tube ensuring and maintaining appropriate focus of the lens.

26. The camera system of claim 1, wherein an extension tube is further modified to allow a filter to be inserted through the side of the extension tube instead of screwed onto the lens itself.

* * * * *

UNITED STATES PATENT AND TRADEMARK OFFICE
CERTIFICATE OF CORRECTION

PATENT NO. : 8,767,078 B2  
APPLICATION NO. : 13/573524  
DATED : July 1, 2014  
INVENTOR(S) : Molde Page 1 of 1

It is certified that error appears in the above-identified patent and that said Letters Patent is hereby corrected as shown below:

In the Specification

Column 2  
Line 12, change "unweildy" to --unwieldy--

Column 2  
Line 22, change "unweildy" to --unwieldy--

Column 2  
Line 63, change "users choosing" to --user's choosing--

Column 4  
Line 44, change "flagship cameras" to --flagship camera's--

Column 4  
Line 44, change "ith" to --with--

Column 5  
Line 2, change "imput" to --input--

Column 9  
Line 29, change "imput" to --input--

Column 11  
Line 11, change "necessary to use of telextenders" to --necessary to use telextenders--

In the Claims

Column 13  
Line 54, Claim 20, change "with a the dedicated video camera" to --with a dedicated video camera--

Signed and Sealed this  
Thirty-first Day of March, 2015

Michelle K. Lee  
*Director of the United States Patent and Trademark Office*